US011711393B2

(12) United States Patent
Assiry et al.

(10) Patent No.: US 11,711,393 B2
(45) Date of Patent: Jul. 25, 2023

(54) METHODS AND SYSTEMS FOR MANAGING WEBSITE ACCESS THROUGH MACHINE LEARNING

(71) Applicant: SAUDI ARABIAN OIL COMPANY, Dhahran (SA)

(72) Inventors: Ibrahim Uthman Assiry, Al Khobar (SA); Sultan Saadaldean Alsharif, Al Khobar (SA); John A. Gwilliams, Dhahran Hills (SA); Nada Essa Alnoaimi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 326 days.

(21) Appl. No.: 17/073,686

(22) Filed: Oct. 19, 2020

(65) Prior Publication Data
US 2022/0124114 A1 Apr. 21, 2022

(51) Int. Cl.
*H04L 9/40* (2022.01)
*H04L 61/4511* (2022.01)
(Continued)

(52) U.S. Cl.
CPC .... *H04L 63/1433* (2013.01); *G06F 18/24155* (2023.01); *G06N 7/01* (2023.01);
(Continued)

(58) Field of Classification Search
CPC ............. H04L 63/1433; H04L 63/0236; H04L 63/105; H04L 61/4511; G06K 9/6278; G06N 7/005
See application file for complete search history.

(56) References Cited

U.S. PATENT DOCUMENTS 7,640,589 B1 12/2009 Mashevsky et al.
8,438,642 B2 5/2013 Feng et al.
(Continued)

FOREIGN PATENT DOCUMENTS

CN 110958246 A 4/2020
WO 2017082470 A1 5/2017
(Continued)

OTHER PUBLICATIONS

Spacek et al., "Current Issue of Malicious Domains Blocking", 2019 IFIP/IEEE Symposium on Integrated Network and Service Management (IM), Apr. 8, 2019, pp. 551-556 (6 pages).*
(Continued)

*Primary Examiner* — Hee K Song
(74) *Attorney, Agent, or Firm* — Osha Bergman Watanabe & Burton LLP (57) ABSTRACT

A method may include obtaining a request to unblock a predetermined website in a network and that is associated with a predetermined list. The predetermined list may be used to determine whether a respective user device among various user devices can access one or more websites. The method may further include determining an impact level of the predetermined website for an organization using a machine-learning algorithm and website gateway data. The method may further include determining a probability of a security breach using the machine-learning algorithm and threat data. The method may further include determining whether to unblock the predetermined website based on the impact level and the probability of a security breach. The method may further include transmitting, in response to determining that the predetermined website should be unblocked, a command that modifies the predetermined list to enable the respective user device to access the predetermined website.

17 Claims, 5 Drawing Sheets

(51) Int. Cl.
  *G06F 18/2415*  (2023.01)
  *G06N 7/01*  (2023.01)
(52) U.S. Cl.
  CPC ...... *H04L 61/4511* (2022.05); *H04L 63/0236* (2013.01); *H04L 63/105* (2013.01)

(56) References Cited

U.S. PATENT DOCUMENTS

| | | | |
|---|---|---|---|
| 8,620,746 B2 | 12/2013 | Granville | |
| 8,621,637 B2 * | 12/2013 | Al-Harbi | ............. H04L 63/1433 713/188 |
| 8,683,584 B1 | 3/2014 | Daswani et al. | |
| 8,813,232 B2 | 8/2014 | Sreedharan et al. | |
| 8,856,545 B2 | 10/2014 | Banerjee et al. | |
| 8,943,588 B1 | 1/2015 | Speegle et al. | |
| 9,032,521 B2 | 5/2015 | Amini et al. | |
| 9,294,497 B1 | 3/2016 | Ben-Or et al. | |
| 9,356,941 B1 | 5/2016 | Kislyuk et al. | |
| 9,384,345 B2 | 7/2016 | Dixon et al. | |
| 9,521,164 B1 | 12/2016 | Angiolelli et al. | |
| 9,781,099 B1 | 10/2017 | Brinskelle | |
| 9,979,726 B2 | 5/2018 | Freitas Fortuna dos Santos et al. | |
| 2014/0331119 A1 | 11/2014 | Dixon et al. | |
| 2015/0215334 A1 | 7/2015 | Bingham et al. | |
| 2016/0255105 A1 * | 9/2016 | Palazzo | ............... H04L 63/1416 726/23 |
| 2017/0026391 A1 * | 1/2017 | Abu-Nimeh | .......... G06F 21/552 |
| 2019/0222602 A1 | 7/2019 | Linder | |
| 2019/0334947 A1 | 10/2019 | Govardhan et al. | |
| 2019/0349351 A1 | 11/2019 | Verma et al. | |
| 2020/0137097 A1 | 4/2020 | Zimmermann et al. | |
| 2020/0137110 A1 | 4/2020 | Tyler et al. | |
| 2020/0162499 A1 | 5/2020 | Alsharif | |
| 2020/0210590 A1 | 7/2020 | Doyle et al. | |
| 2021/0194909 A1 * | 6/2021 | Tang | ................... H04L 63/1416 |

FOREIGN PATENT DOCUMENTS

| | | | |
|---|---|---|---|
| WO | 2017086992 A1 | 5/2017 | |
| WO | 2019144039 A1 | 7/2019 | |
| WO | WO-2019144039 A1 * | 7/2019 | ........... G06F 16/986 |

OTHER PUBLICATIONS

"What is Machine Learning? a definition", Expert System, Expert System S.p.A., published Mar. 2017, updated May 2020, URL: <https://expertsystem.com/machine-learning-definition/> (2 pages).
Brownlee, Jason, "Naive Bayes for Machine Learning", Machine Learning Mastery: Making Developers Awesome at Machine Learning, Machine Learning Mastery Pty. Ltd., published Apr. 11, 2016, updated Aug. 15, 2020, URL: <https://machinelearningmastery.com/naive-bayes-for-machine-learning/> (16 pages).
"URL reputation score", Citrix: Product Documentation, Citrix Systems, Inc., Jun. 2019, URL:<https://docs.citrix.com/en-uS/citrix-secure-web-gateway/12-1/security-configuration/url-reputation-score.html> (2 pages).
International Search Report and Written Opinion issued in Application No. PCT/US2021/055570, dated Feb. 2, 2022 (13 pages).

* cited by examiner

METHODS AND SYSTEMS FOR MANAGING WEBSITE ACCESS THROUGH MACHINE LEARNING

BACKGROUND

As the number of applications increases in an organization, cybersecurity risks associated with security vulnerabilities may also increase. For example, one of the most common cybersecurity risks is a member of an organization accessing a website operated by a malicious entity or previously compromised by the malicious entity. Once the compromised website is accessed by members in an organization, malicious parties may cause possible harm by exploiting this compromised website. Accordingly, organizations frequently use various lists to determine which websites are available to members of an organization.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor, a request to unblock a predetermined website in a network and that is associated with a predetermined list. The predetermined list is used to determine whether a respective user device among various user devices can access one or more websites. The method further includes determining, by the computer processor, an impact level of the predetermined website for an organization using a machine-learning algorithm and website gateway data. The method further includes determining, by the computer processor, a probability of a security breach using the machine-learning algorithm and threat data. The method further includes determining, by the computer processor, whether to unblock the predetermined website based on the impact level and the probability of a security breach. The method further includes transmitting, by the computer processor and in response to determining that the predetermined website should be unblocked, a command that modifies the predetermined list to enable at least the respective user device to access the predetermined website.

In general, in one aspect, embodiments relate to a server that includes a computer processor and a memory coupled to the computer processor. The memory obtains, from a user device, a request to unblock a predetermined website in a network and that is associated with a predetermined list. The predetermined list is used to determine whether a respective user device among various user devices can access one or more websites. The memory further determines an impact level of the predetermined website for an organization using a machine-learning algorithm and website gateway data. The memory further determines a probability of a security breach using the machine-learning algorithm and threat data. The memory further determines whether to unblock the predetermined website based on the impact level and the probability of a security breach. The memory further transmits, in response to determining that the predetermined website should be unblocked, a command that modifies the predetermined list to enable the respective user device to access the predetermined website.

In general, in one aspect, embodiments relate to a system that includes a network that includes various user devices. The system further includes a web gateway that includes a predetermined list. The web gateway is coupled to the user devices. The system further includes a server coupled to the user devices and the web gateway. The server includes a computer processor. The server obtains a request to unblock a predetermined website in a network and that is associated with a predetermined list. The predetermined list is used to determine whether a respective user device among the user devices can access one or more websites. The server further determines an impact level of the predetermined website for an organization using a machine-learning algorithm and website gateway data. The server further determines a probability of a security breach using the machine-learning algorithm and threat data. The server further determines whether to unblock the predetermined website based on the impact level and the probability of a security breach. The server further transmits, to the web gateway and in response to determining that the predetermined website should be unblocked, a command that modifies the predetermined list to enable the respective user device to access the predetermined website.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include a system and a method for determining impact levels and security breach probabilities regarding unblocking a website using machine-learning algorithms. For example, when a website is unblocked, a small or a large number of users may proceed to access the unblocked website. Different numbers of users may result in different effects on a network or organization if that unblocked website is the source of a malicious attack or security breach. Likewise, different websites may have different likelihoods or risk levels of incurring a cybersecurity attack. Thus, a machine-learning algorithm, such as a Naive Bayes algorithm, may determine values of impact levels and security breach probabilities based on different types of data collected within a network, such as web gateway data, antivirus engine data, etc., as well as data external to the network, such an external threat data. Using the values of impact levels and security breach probabilities, for example, a network may make decisions accordingly regarding whether to unblock a website or not.

Figure 1:
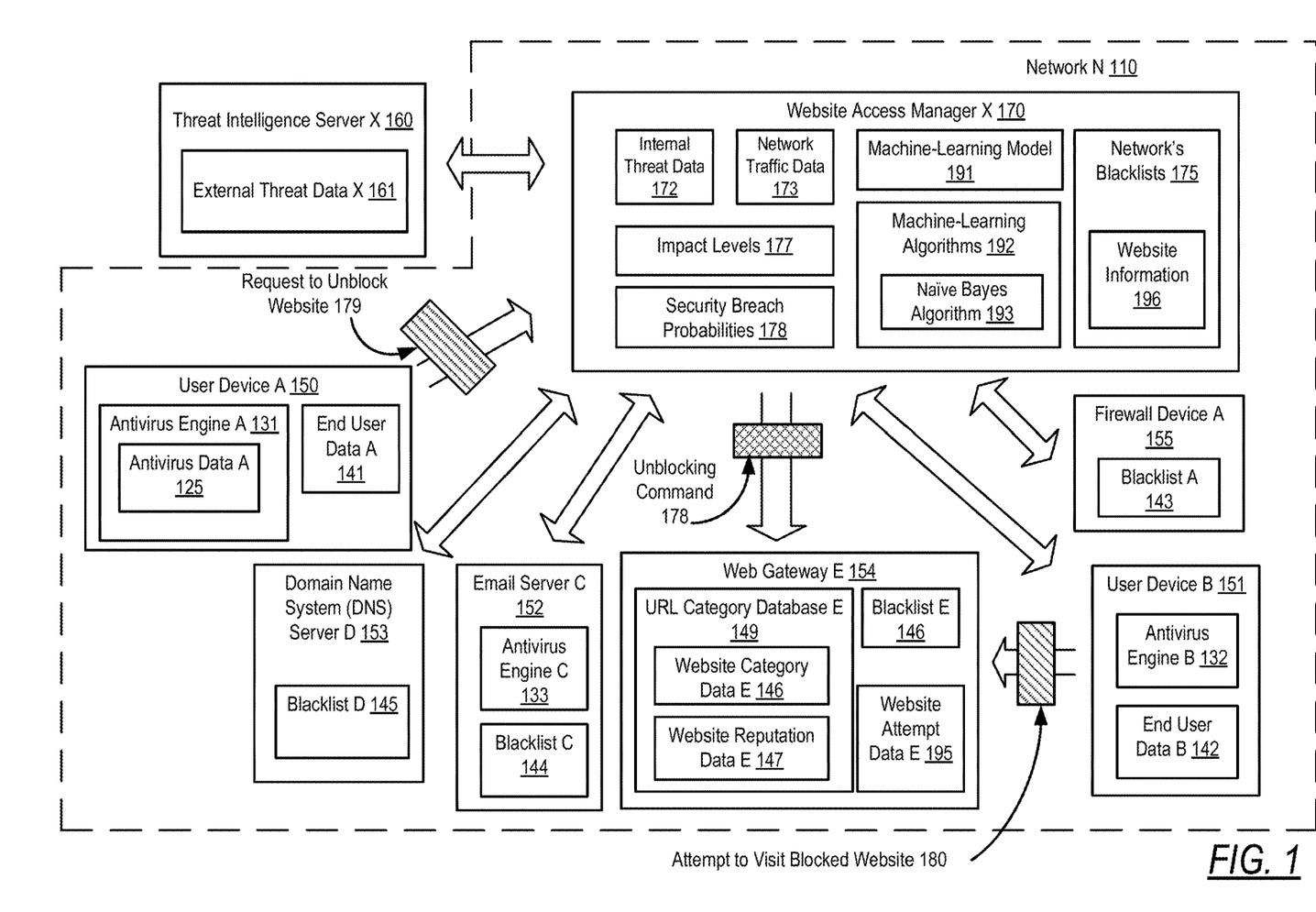
FIG. 1 shows a system in accordance with one or more embodiments.

Turning to FIG. 1, FIG. 1 shows a block diagram of a system in accordance with one or more embodiments. As shown in FIG. 1, a network (e.g., network N (110)) may include various user devices (e.g., user device A (150), user device B (151)), an email server (e.g., email server C (152)), a domain name system (DNS) server (e.g., DNS server D (153)), a web gateway (e.g., web gateway E (154)), and a firewall device (e.g., firewall device A (155)). User devices may include personal computers, smartphones, human machine interfaces, and any other user-operated devices coupled to a network. With regard to an email server, an email server may include hardware and/or software that includes functionality for sending and receiving emails. In particular, an email server may manage email accounts for one or more hosted email domains. Likewise, email servers may send and receive email using one or more email protocols, such as an SMTP protocol, an IMAP protocol, and a POP3 protocol. With regard to a DNS server, the DNS server may be hardware and/or software that maps domain names to Internet Protocol (IP) addresses and/or vice versa. For example, a DNS server (e.g., DNS server D (153)) may receive DNS queries from various user devices in order to identify domains for websites. Thus, a DNS server may filter DNS queries directed to the domains of one or more blocked websites. By blocking the domain name, DNS filtering may accordingly block a website and all its webpages, e.g., with respect to each Uniform Resource Location (URL) in a domain.

Furthermore, a web gateway may be hardware and/or software that performs one or more cybersecurity operations and/or enforces one or more security policies with regard to Internet usage. For example, a web gateway may be a server that operates between a company's user devices and the Internet in order to filter unsafe content from web traffic. Examples of unsafe content may include cybersecurity threats, data breaches, risky user operations, and/or unauthorized user behavior. For example, a web gateway may include functionality for URL filtering, anti-malware detection and blocking, and application access control. More specifically, when a user device sends a request to access a particular website (e.g., attempt to visit blocked website (180)) or other application on the Internet, the request may be transmitted to a web gateway prior to connecting a user device to the actual website. After inspecting a request to access a website, the web gateway may only then forward the request based on the inspected website not violating any established security policies. In some embodiments, a web gateway records and stores user connection attempts to access blocked websites (e.g., website attempt data E (195)).

In some embodiments, a web gateway includes functionality for obtaining web gateway data, such as website category data (e.g., website category data E (146)). More specifically, a URL filtering entity may provide multiple website categories that are associated with respective groups of URLs. A particular website category may be related to websites with a similar topic or which may be considered objectionable for similar reasons. For example, URLs associated with phishing attacks may be tracked with a "phishing" category. Likewise, categorization may be an automated process, where a URL filtering service may use machine learning to identify websites that fit a particular category. Thus, a web gateway may blocking individual URLs based on specific website categories. By doing so, companies may restrict the type of content accessed over their networks by blocking large groups of URLs at once instead of having to filter individual URLs. Examples of website categories may include adult websites, streaming media websites, sports websites, or social networking websites.

In some embodiments, web gateway data includes website reputation data (e.g., website reputation data E (146)). For example, website reputation data may correspond to a specific reputation score for rating a website's risk level. In some embodiments, a reputation score may range from '1' to '4', where '1' corresponds to a clean site, '2' corresponds to an unknown site, '3' corresponds to a potentially dangerous website or one affiliated to a dangerous web site, and '4' corresponds to a malicious site, i.e., the riskiest type of website for users to access.

In some embodiments, web gateway data is obtained from a URL category database (e.g., URL category database E (149)). For example, a company may use an external URL category database provided by one or more vendors. In another embodiment, a network or organization may independently determine website category data and/or website reputation data, e.g., by analyzing a particular website following a request to unblock the website. While the URL category database E (149) is shown as part of the web gateway E (154) in FIG. 1, in other embodiments, the URL category database E (149) may be disposed on one or more servers located outside network N (110).

Keeping with web gateways, in some embodiments, a web gateway operates as a proxy server, which may be an actual physical server or a virtual machine in a network cloud. In other embodiments, web gateways may be a software-based gateways that runs on a company's premises or as a software-as-a-service (SaaS) application. In another embodiment, web gateways are on-premises hardware devices that connect directly to a company's IT infrastructure.

Turning to firewall devices, a network may include one or more firewall devices (e.g., firewall device A (155)) that may be hardware and/or software that restricts access to a portion of a network. For example, a firewall device may identify specific IP addresses as being the source or destination of Internet traffic. Accordingly, the firewall device may filter specific Internet traffic based on whether a particular IP address is blocked or allowed. Thus, firewall devices may prevent unauthorized internet users from accessing private networks connected to the Internet, especially intranets.

Turning to antivirus engines, one or more network elements in a network may be coupled to an antivirus engine (e.g. antivirus engine A (131), antivirus engine B (132), antivirus engine C (133)). For example, an antivirus engine may be hardware and/or software that includes functionality for identifying and removing malicious code from a network element, such as user devices. Thus, an antivirus engine may detect viruses and malware by comparing files on various network endpoints against code samples (i.e., antivirus signatures) of known virus and malware components (i.e., definitions). In some embodiments, antivirus engines include functionality for scanning network devices as well as websites. For example, an antivirus engine may operate on a user device, at an email server, and/or other network elements. As such, an antivirus engine may produce antivirus engine data (e.g., antivirus data A (125)) that describes the results of one or more antivirus scans. For example, antivirus data may describe the source of a particular computer virus on a network device. Thus, antivirus engine data may identify the actual website that caused a computer virus, the category of website that provided the computer virus, the computer program that was used by a user that introduced the computer virus, etc. Likewise, antivirus engines may also scan network devices for security vulnerabilities, such as unprotected confidential data, tracking cookies, etc., which may be described within the antivirus engine data as well. Thus, antivirus engine data may be used to determine the extent of damage that may result from a security breach by unblocking a risky website.

Moreover, a network may use one or more predetermined lists (e.g., blacklist B (143), blacklist C (144), blacklist D (145), blacklist E (146)) to control access to various websites and various website domains. Different types of lists may be used, such as blacklists (also called "denylists" and "blocklists"), whitelists (also called "allowlists" and "passlists"), and/or greylists. A list may include website information (e.g., website information (196)) that identifies a predetermined website, e.g., by domain name, IP address, netmask information, blacklist metadata, etc. A website may be blocked for various reasons, such as being associated with malicious conduct such as phishing schemes, trojan horses, pharma hacks, etc. as well as simply being an unknown entity or intended for an unproductive purpose.

Under a blacklist, for example, user devices may generally access any URLs except those that are included in a respective blacklist. In contrast to a blacklist, a whitelist allows user devices to only access a list of allowed URLs and/or other identified entities within the whitelist, while blocking traffic to all other websites. With respect to greylists, a greylist is a method of temporarily blocking or temporarily allowing websites until an additional action is performed, e.g., after a review by a cybersecurity administrator approving or permanently blocking the website. For example, an email server using greylisting may temporarily reject an email from an unrecognized domain. If the email is legitimate, an originating server may try again after a predetermined time delay, and after sufficient time has elapsed, the email may be accepted. Thus, organizations may use different types of lists to restrict access to certain websites such as social media, video streaming, online shopping, or malicious websites.

In some embodiments, a network includes a website access manager (e.g., website access manager X (170)). In particular, a website access manager may be software and/or hardware, such as a network controller, that includes functionality for determining whether to unblock various websites. In some embodiments, for example, a website access manager makes an unblocking determination by using impact levels, probabilities of security breaches, and/or machine learning. Moreover, a blocked website may be assigned an impact level (e.g., one of the impact levels (177)) and/or a probability of a security breach (e.g., one of the security breach probabilities (178)) based on internal data acquired throughout a network and/or external data from data sources outside the network. In regard to impact levels, an impact level may be a computed value that corresponds to an amount of exposure that a network or organization may experience by unblocking a particular website. In other words, assuming a website becomes unblocked, an impact level may identify or predict how many users may access the unblocked website. Thus, a potential popular website may have a higher impact level, while an obscure niche website may have a lower impact level because only a small percentage of user devices within access the niche website.

With regard to probabilities of security breaches, a website access manager may determine a probability value regarding the possibility that unblocking a specific website will result in a security violation or a security breach to a network or organization. For example, a user device with one or more known security vulnerabilities may have a higher probability of being compromised than another user device with no known security vulnerabilities, e.g., because of regular software updates and through security protocols.

In some embodiments, a website access manager uses one or more machine-learning algorithms and/or one or machine-learning models to determine an impact level and/or a probability of a security breach based on unblocking one or more websites. For example, a machine-learning model may include a learned Naive Bayes model, support vector machines, decision trees, inductive learning models, neural networks, deductive learning models, unsupervised learning models, etc. Machine-learning algorithms may include training algorithms such as Naive Bayes algorithms (e.g., Naive Bayes algorithm (193)), supervised algorithms, unsupervised algorithms, and/or reinforcement learning algorithms.

With respect to Naive Bayes algorithms, a Naive Bayes algorithm may be a classification algorithm for binary classification (i.e., distinguishing between two classes) and multi-class classifications. In particular, a Naive Bayes algorithm may determine probability values of multiple attributes by assuming attribute values are conditionally independent given a particular value. As such, a learned Naive Bayes model may be a classifier model that includes various class probabilities and/or conditional probabilities with respect to various input features and output classes. As such, the learned Naive Bayes model may include attributes, values, and weights that implements a Bayesian analysis providing a rule for quantifying probabilities based on evidence or machine-learning features, such as network traffic data, end user data, web gateway data, and threat data, to determine impact levels and probabilities of security breaches. A Bayesian analysis may use the Bayes' theorem which describes the posterior probability of a hypothesis after evidence is observed in terms of prior knowledge (e.g., the prior probability of the hypothesis) that may be related to the evidence (e.g., the probability of evidence given the hypothesis). The Bayes' theorem may be expressed using the following equation:

$$P(H|E)=P(E|H)*P(H)/P(E) \qquad \text{Equation 1}$$

where P(H|E) is the posterior probability of hypothesis H given the evidence E, P(E) is the probability of the evidence E regardless of the hypothesis, P(H) is the prior probability of the hypothesis H being true regardless of the evidence, and P(E|H) is the probability of evidence E given that the hypothesis H is true.

Keeping with Naive Bayes algorithms, a website access manager may use network traffic data, web gateway data, antivirus engine data, end user data, and/or threat data (e.g., external threat data X (161), internal threat data (172)) as inputs to a learned Naive Bayes model. With regard to Equation 1, for example, a hypothesis may be that the predetermined website that will not result in a security breach if unblocked. Likewise, the hypothesis may also be that unblocking the website will correspond to a security breach that has a minimal effect on a network or organization. In regard to evidence in Equation 1, evidence may correspond to one or more impact levels and/or probabilities of different types of security breaches.

Figure 2:
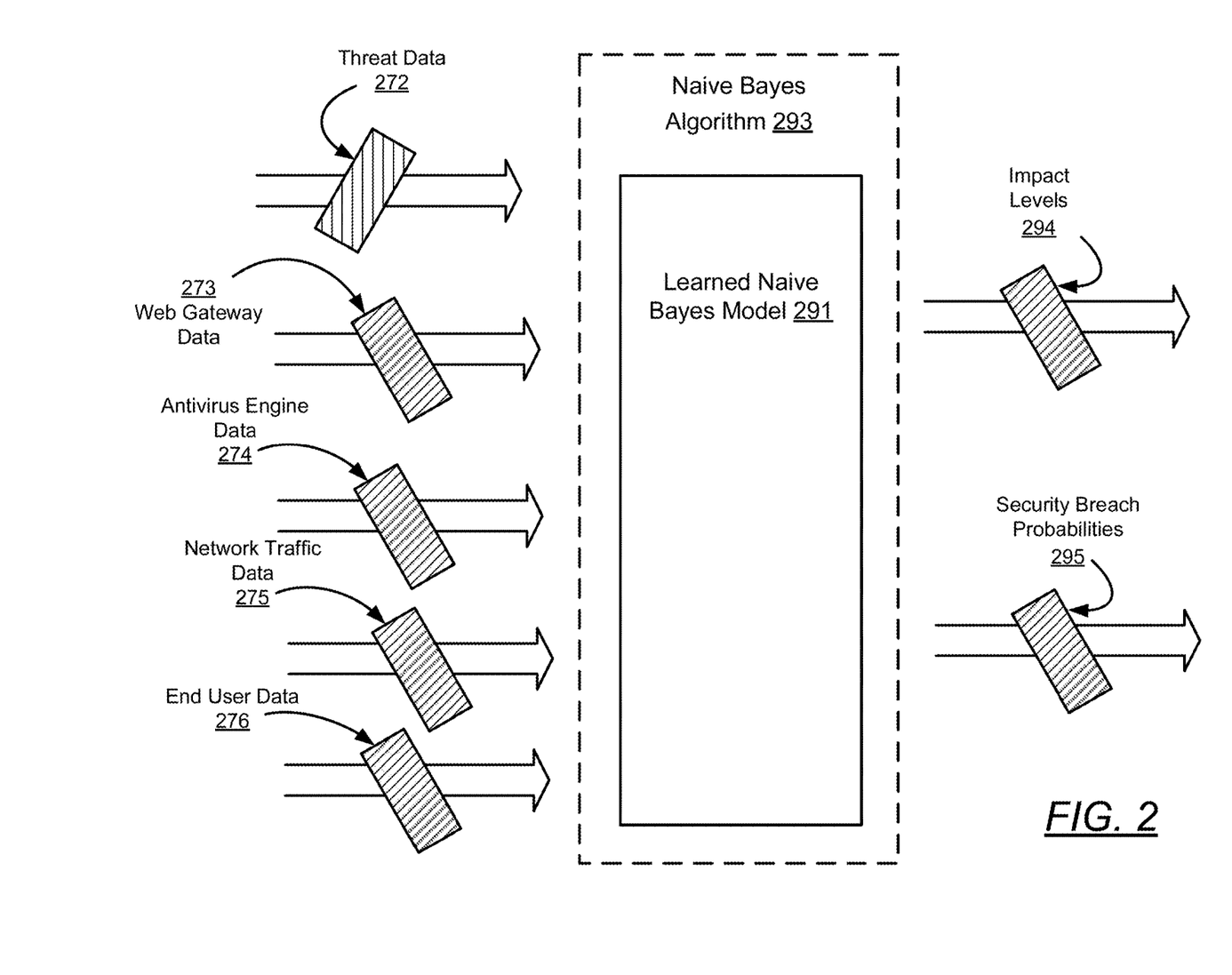
FIG. 2 shows an example in accordance with one or more embodiments.

Turning to FIG. 2, FIG. 2 provides an example of generating a model to determine impact levels and security breach probabilities. The following example is for explanatory purposes only and not intended to limit the scope of the disclosed technology. In FIG. 2, a learned Naive Bayes model (291) is trained using a Naive Bayes algorithm (293). In particular, the learned Naive Bayes model (291) obtains five inputs for training, i.e., threat data (272), website gateway data (273), antivirus engine data (274), network traffic data (275), and end user data (276). Using the inputs, the learned Naive Bayes model (291) outputs impact levels (294) and security breach probabilities (295).

Returning to FIG. 1, a website access manager includes functionality for obtaining internal threat data and/or external threat data, e.g., for use in determining impact levels and/or security breach probabilities. More specifically, internal threat data may include information that describes one or more cybersecurity attacks that target an organization specifically, such as attacks against a company's website. For example, internal threat data may be obtained from an internal data feed that records a frequency and/or types of attacks against various network elements.

Turning to external threat data, external threat data may be publicly available data regarding known security vulnerabilities. In some embodiments, for example, external threat data includes Common Vulnerability and Exposure (CVE) data. In particular, CVE data may provide a list of publicly known security vulnerabilities and exposures for different hardware devices as well as different software applications. CVE data may include a data entry with a brief description of the security vulnerability or exposure, such that CVE data may include a CVE ID number to share data across separate network security databases. An example of the CVE ID is CVE-YYYY-NNNN, where YYYY refers to a particular year when a vulnerability is discovered, and NNNN refers to arbitrary string identifying the security vulnerability. To qualify for a CVE entry, a vulnerability may need to be independently fixable by affected vendors without modifying internal workflows of an organization. In some embodiments, a website access manager (170) may include functionality to obtain external threat data (e.g., external thread data X (161)) from a threat intelligence server (e.g., thread intelligence server (160)) located outside a network. For example, an external threat data source may be a publicly available database located on the Internet that includes functionality for communicating with a website access manager.

Keeping with FIG. 1, a website access manager may obtain network traffic data and end user data. Network traffic data may include web logs regarding which types of websites and network locations are used by user devices coupled to the network. In some embodiments, for example, a website access manager may monitor and record the number of user connection attempts (e.g., attempt to visit blocked website (180)) to a blocked website. Network traffic data may also describe traffic flow within a network, e.g., to provide an understanding of how a network functions in order to predict the outcome of a security breach. End user data may include website and network data collected at user devices. For example, end user data may include end user logs regard which websites are visited by different users.

Furthermore, a website access manager includes functionality for transmitting one or more unblocking commands (e.g., unblocking command (178)) in response to a request (e.g., request to unblock website (179)) based on impact levels and/or security probabilities. For example, the request to unblock a website may be transmitted by a user with a user device (e.g., the request (179) may be triggered by a graphical user interface or the request may be an email directed to a particular entity). Likewise, the request may be automatically performed in response to a particular number of user connection attempts to access a blocked website. After receiving the request, a website access manager may determine whether the impact levels and/or security breach probabilities associated with the website satisfy one or more predetermined criteria. For example, certain scores as well as ranges of values regarding impact levels and/or security breach probabilities may be assigned for unblocking a website. On the other hand, other scores may cause a website access manager to maintain a block on the website.

A network may include one or more network elements in addition to the network elements shown in FIG. 1. A network element may refer to various hardware components within a network, such as switches, routers, and hubs, as well as user devices, servers, network storage devices, user equipment, or any other logical entities for uniting one or more physical devices on the network. In some embodiments, a website access manager, network elements, user equipment, user devices, servers, and/or network storage devices may be computing systems similar to the computing system described in FIG. 5.

While FIG. 1 shows various configurations of components, other configurations may be used without departing from the scope of the disclosure. For example, various components in FIG. 1 may be combined to create a single component. As another example, the functionality performed by a single component may be performed by two or more components.

Figure 3:
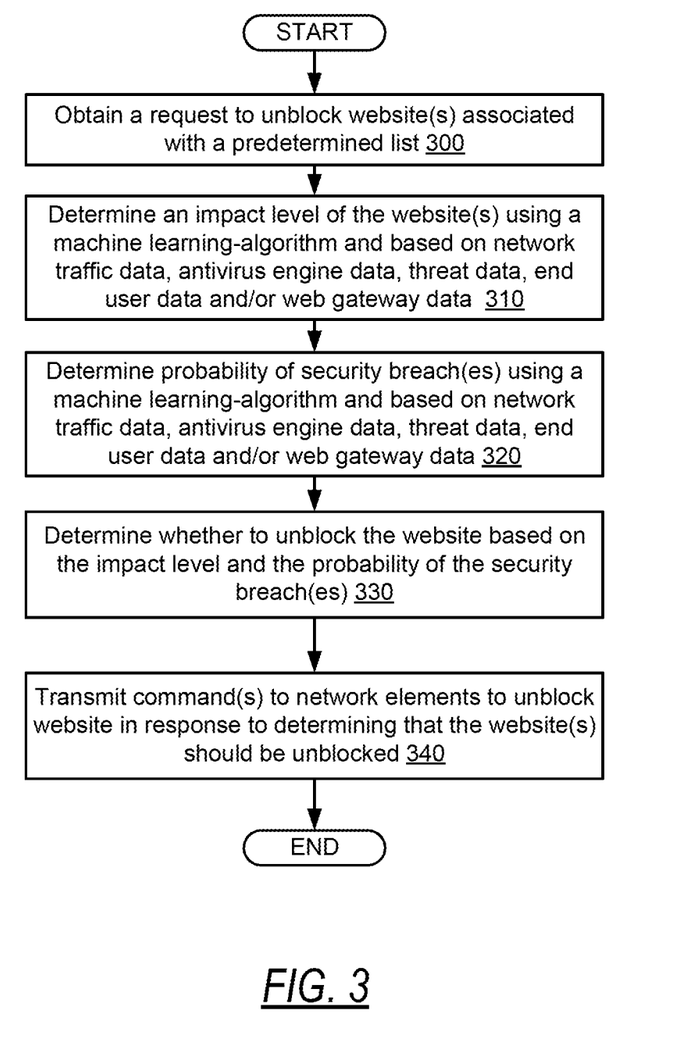
FIG. 3 shows a flowchart in accordance with one or more embodiments.

Turning to FIG. 3, FIG. 3 shows a flowchart in accordance with one or more embodiments. Specifically, FIG. 3 describes a general method for determine impact levels and/or security breach probabilities for unblocking websites. One or more blocks in FIG. 3 may be performed by one or more components (e.g., website access manager (170)) as described in FIGS. 1 and/or 2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, a request is obtained to unblock one or more websites associated with a predetermined list in accordance with one or more embodiments. For example, the predetermined list may be a blacklist, a greylist, or a whitelist disposed on one or more network elements. The request may be similar to request (179) described above in FIG. 1 and the accompanying description.

In Block 310, an impact level of one or more websites are determined using a machine learning-algorithm and based on network traffic data, antivirus engine data, threat data, end user data and/or web gateway data in accordance with one or more embodiments. The impact level may be similar to the impact levels described above in FIG. 1 and the accompanying description.

In Block 320, a probability of one or more security breaches is determined using a machine learning-algorithm and based on network traffic data, antivirus engine data, threat data, end user data and/or web gateway data in accordance with one or more embodiments. The probability of a security breach may be similar to the security breach probabilities described above in FIG. 1 and the accompanying description.

In some embodiments, the machine-learning algorithm generates a learned model that include attributes that describe various security vulnerabilities. For example, attributes may include a cyberattack campaign attribute, a secure website reputation attribute, a secure website category attribute, and a malicious content presence attribute. Values for a particular attribute may have corresponding labels related to various categories for the particular attribute. The weight of a particular value may be determined by previous experience or machine-learning algorithms. An example of the attributes, values, and weights used to calculate a probability of a security breach may be found in Table 1 below:

TABLE 1

Example Attributes, Values, and Weights of a Learned Naive Bayes Model

|   | Attributes | Values | Weight |
|---|---|---|---|
| 1 | Is the URL part of a cyber campaign? | No | 0 |
|   |   | Yes | 1 |
| 2 | What is the website reputation? | Secure | 0 |
|   |   | No secure | 1 |
| 3 | What is the website category? | Secure | 0 |
|   |   | No secure | 1 |
| 4 | Does the website contains malicious content? | No | 0 |
|   |   | Yes | 1 |

In Block 330, a determination is made whether to unblock the predetermined website based on an impact level and/or a probability of a security breach in accordance with one or more embodiments.

In Block 340, one or more commands are transmitted to one or more network elements to unblock website in response to determining that one or more websites should be unblocked in accordance with one or more embodiments. For example, once a website access manager determines that a website should be unblocked, the website access manager may transmit one or more commands over a network in order to implement changes in security protocols. As such, the commands may add or remove the website from one or more lists, such as blacklists and whitelists that are stored on various network elements throughout a network.

Figure 4:
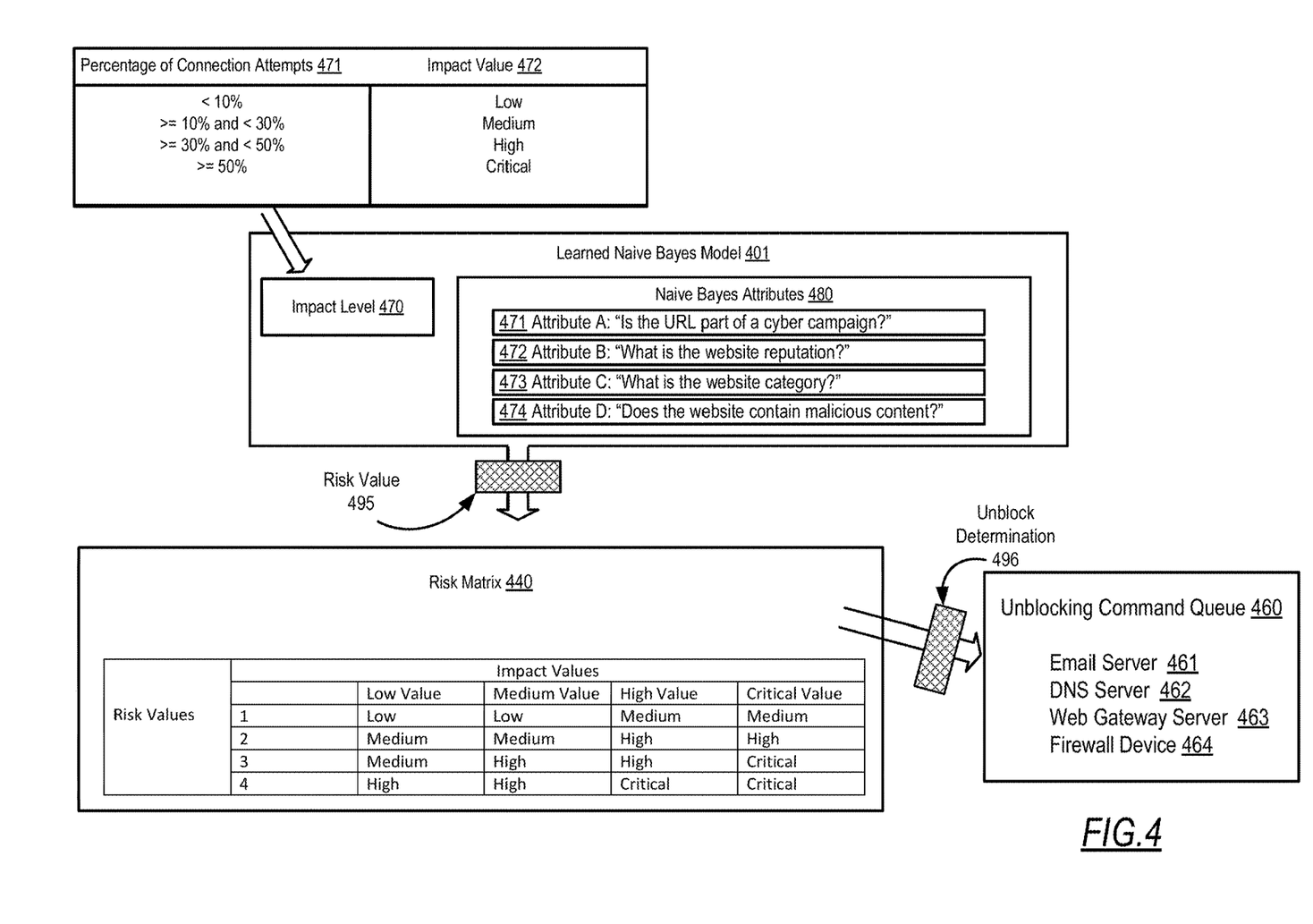
FIG. 4 shows an example in accordance with one or more embodiments.

Turning to FIG. 4, FIG. 4 provides an example of using impact levels and security breach probabilities to unblock websites. The following example is for explanatory purposes only and not intended to limit the scope of the disclosed technology. In FIG. 4, a percentages of user connection attempts (471) correspond to different impacts (472) within an organization. Accordingly, a Naive Bayes algorithm uses the percentages of user connection attempts (471) with additional data to determine the impact level (470). Likewise, a learned Naive Bayes model (401) includes various Naive Bayes attributes (480) (i.e., attribute A (471), attribute B (472), attribute C (473), attribute D (474)) and the impact level (470) to generate a risk value (495) that is similar to a security breach probability. Accordingly, the impact level (470) and a risk value (495) are used with a risk matrix (440) for making an unblock determination (496) regarding a requested website. Accordingly, an unblocking command queue (460) is used by a website access manager to implement the unblock across a network, e.g., by sending unblocking commands to an email server (461), a DNS server (462), a web gateway server (463), and a firewall device (464).

Figure 5:
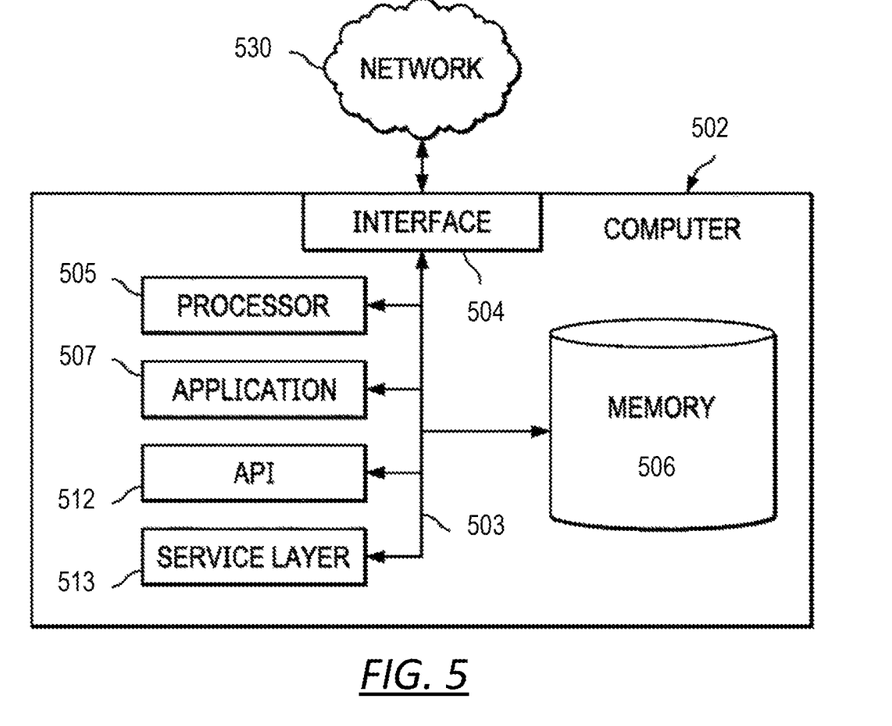
FIG. 5 shows a computer system in accordance with one or more embodiments.

Embodiments may be implemented on a computer system. FIG. 5 is a block diagram of a computer system (502) used to provide computational functionalities associated with described algorithms, methods, functions, processes, flows, and procedures as described in the instant disclosure, according to an implementation. The illustrated computer (502) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (502) may include a computer that includes an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. The illustrated computer (502) is communicably coupled with a network (530). In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502)) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502). The functionality of the computer (502) may be accessible for all service consumers using this service layer. Software services, such as those provided by the service layer (513), provide reusable, defined business functionalities through a defined interface. For example, the interface may be software written in JAVA, C++, or other suitable language providing data in extensible markup language (XML) format or other suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or sub-modules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504 includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (505). Although illustrated as a single computer processor (505) in FIG. 5, two or more processors may be used according to particular needs, desires, or particular implementations of the computer (502). Generally, the computer processor (505) executes instructions and manipulates data to perform the operations of the computer (502) and any algorithms, methods, functions, processes, flows, and procedures as described in the instant disclosure.

The computer (502) also includes a memory (506) that holds data for the computer (502) or other components (or a combination of both) that can be connected to the network (530). For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502).

The application (507) is an algorithmic software engine providing functionality according to particular needs, desires, or particular implementations of the computer (502), particularly with respect to functionality described in this disclosure. For example, application (507) can serve as one or more components, modules, applications, etc. Further, although illustrated as a single application (507), the application (507) may be implemented as multiple applications (507) on the computer (502). In addition, although illustrated as integral to the computer (502), in alternative implementations, the application (507) can be external to the computer (502).

There may be any number of computers (502) associated with, or external to, a computer system containing computer (502), each computer (502) communicating over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

In some embodiments, the computer (502) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, and/or function as a service (FaaS).

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method, comprising:
   obtaining, by a computer processor, a request to unblock a predetermined website in a network and that is associated with a predetermined list, wherein the predetermined list is used to determine whether a respective user device among a plurality of user devices can access one or more websites;
   determining a number of user connection attempts to access the predetermined website using end user data, wherein the end user data is obtained from a plurality of end user logs that are located on the plurality of user devices;

determining, by the computer processor, an impact level of the predetermined website for an organization using a machine-learning algorithm and web gateway data, wherein the impact level is further determined based on the number of user connection attempts;

determining, by the computer processor, a probability of a security breach using the machine-learning algorithm and threat data;

determining, by the computer processor, whether to unblock the predetermined website based on the impact level and the probability of a security breach; and transmitting, by the computer processor and in response to determining that the predetermined website should be unblocked, a command that modifies the predetermined list to enable at least the respective user device of the plurality of user devices to access the predetermined website.

2. The method of claim 1, wherein the predetermined list is a blacklist stored in a domain name system (DNS) server that manages DNS records for a network, and wherein the command removes the predetermined website from the blacklist.

3. The method of claim 1, further comprising:

obtaining, from a threat intelligence server, external threat data regarding one or more security vulnerabilities; and obtaining, from within the network, internal threat data based on one or more cybersecurity attacks against the network, and wherein the threat data comprises the external threat data and the internal threat data.

4. The method of claim 1, wherein the web gateway data comprise website reputation data and website category data, and wherein the web gateway data is obtained from a URL category database located outside the network.

5. The method of claim 1, further comprising:

obtaining, from a plurality of antivirus engines disposed on the plurality of user devices, antivirus engine data, wherein the antivirus engine data is used by the machine-learning algorithm to determine the impact level and the probability of the security breach.

6. The method of claim 1, wherein the request is transmitted to a server by a user device among the plurality of user devices, wherein the computer processor is located on the server, and wherein the server stores the web gateway data and the threat data.

7. A method, comprising:

obtaining, by a computer processor, a request to unblock a predetermined website in a network and that is associated with a predetermined list, wherein the predetermined list is used to determine whether a respective user device among a plurality of user devices can access one or more websites;

determining, by the computer processor, an impact level of the predetermined website for an organization using a machine-learning algorithm and web gateway data;

determining, by the computer processor, a probability of a security breach using the machine-learning algorithm and threat data;

determining, by the computer processor, whether to unblock the predetermined website based on the impact level and the probability of a security breach; and transmitting, by the computer processor and in response to determining that the predetermined website should be unblocked, a command that modifies the predetermined list to enable at least the respective user device of the plurality of user devices to access the predetermined website, wherein the machine-learning algorithm is Naive Bayes algorithm that uses the web gateway data and the threat data as inputs to a learned Naive Bayes model, wherein the learned Naive Bayes model comprises a plurality of attributes, a plurality of class probabilities, and a plurality of conditional probabilities based on the web gateway data and the threat data, and wherein the plurality of attributes comprise a cyberattack campaign attribute, a secure website reputation attribute, a secure website category attribute, and a malicious content presence attribute.

8. A server, comprising:

a computer processor; and a memory coupled to the computer processor, wherein the memory comprises functionality for:

obtaining, from a user device, a request to unblock a predetermined website in a network and that is associated with a predetermined list, wherein the predetermined list is used to determine whether a respective user device among a plurality of user devices can access one or more websites;

determining a number of user connection attempts to access the predetermined website using end user data, wherein the end user data is obtained from a plurality of end user logs that are located on the plurality of user devices;

determining an impact level of the predetermined website for an organization using a machine-learning algorithm and web gateway data, wherein the impact level is further determined based on the number of user connection attempts;

determining a probability of a security breach using the machine-learning algorithm and threat data;

determining whether to unblock the predetermined website based on the impact level and the probability of a security breach; and transmitting, in response to determining that the predetermined website should be unblocked, a command that modifies the predetermined list to enable the respective user device of the plurality of user devices to access the predetermined website.

9. The server of claim 8, wherein the predetermined list is a whitelist stored in a web gateway server, and wherein the command adds the predetermined website to the whitelist.

10. The server of claim 8, wherein the memory further comprises functionality for:

obtaining, from a threat intelligence server, external threat data regarding one or more security vulnerabilities; and obtaining, from within the network, internal threat data based on one or more cybersecurity attacks against the network, and wherein the threat data comprises the external threat data and the internal threat data.

11. The server of claim 8, wherein the web gateway data comprise website reputation data and website category data, and wherein the web gateway data is obtained from a URL category database located outside the network.

12. The server of claim 8, wherein the memory further comprises functionality for:
obtaining, from a plurality of antivirus engines disposed on the plurality of user devices, antivirus engine data, wherein the antivirus engine data is used by the machine-learning algorithm to determine the impact level and the probability of the security breach.

13. A server, comprising:
a computer processor; and
a memory coupled to the computer processor, wherein the memory comprises functionality for:
obtaining, from a user device, a request to unblock a predetermined website in a network and that is associated with a predetermined list, wherein the predetermined list is used to determine whether a respective user device among a plurality of user devices can access one or more websites;
determining an impact level of the predetermined website for an organization using a machine-learning algorithm and web gateway data;
determining a probability of a security breach using the machine-learning algorithm and threat data;
determining whether to unblock the predetermined website based on the impact level and the probability of a security breach; and
transmitting, in response to determining that the predetermined website should be unblocked, a command that modifies the predetermined list to enable the respective user device of the plurality of user devices to access the predetermined website,
wherein the machine-learning algorithm is Naive Bayes algorithm that uses the web gateway data and the threat data as inputs to a learned Naive Bayes model,
wherein the learned Naive Bayes model comprises a plurality of attributes, a plurality of class probabilities, and a plurality of conditional probabilities based on the web gateway data and the threat data, and
wherein the plurality of attributes comprise a cyberattack campaign attribute, a secure website reputation attribute, a secure website category attribute, and a malicious content presence attribute.

14. A system, comprising:
a network comprising a plurality of user devices;
a web gateway comprising a predetermined list and coupled to the plurality of user devices; and
a server coupled to the plurality of user devices and the web gateway, wherein the server comprises a computer processor and is configured to:
obtain a request to unblock a predetermined website in the network and that is associated with a predetermined list, wherein the predetermined list is used by the web gateway to determine whether a respective user device among the plurality of user devices can access one or more websites;
determine a number of user connection attempts to access the predetermined website using end user data, wherein the end user data is obtained from a plurality of end user logs that are located on the plurality of user devices;
determine an impact level of the predetermined website for an organization using a machine-learning algorithm and web gateway data that is obtained from the web gateway,
wherein the impact level is further determined based on the number of user connection attempts;
determine a probability of a security breach using the machine-learning algorithm and threat data;
determine whether to unblock the predetermined website based on the impact level and the probability of a security breach; and
transmit, to the web gateway and in response to determining that the predetermined website should be unblocked, a command that modifies the predetermined list to enable the respective user device of the plurality of user devices to access the predetermined website.

15. The system of claim 14, further comprising:
a threat intelligence server coupled to the server,
wherein the server obtains external threat data from the threat intelligence server regarding one or more security vulnerabilities; and
wherein the server obtains internal threat data from the network based on one or more cybersecurity attacks against the network, and
wherein the threat data comprises the external threat data and the internal threat data.

16. The system of claim 14,
wherein the web gateway data comprise website reputation data and website category data, and
wherein the web gateway data is obtained from a URL category database located outside the network.

17. A system, comprising:
a network comprising a plurality of user devices;
a web gateway comprising a predetermined list and coupled to the plurality of user devices; and
a server coupled to the plurality of user devices and the web gateway, wherein the server comprises a computer processor and is configured to:
obtain a request to unblock a predetermined website in the network and that is associated with a predetermined list, wherein the predetermined list is used by the web gateway to determine whether a respective user device among the plurality of user devices can access one or more websites;
determine an impact level of the predetermined website for an organization using a machine-learning algorithm and web gateway data that is obtained from the web gateway;
determine a probability of a security breach using the machine-learning algorithm and threat data;
determine whether to unblock the predetermined website based on the impact level and the probability of a security breach; and
transmit, to the web gateway and in response to determining that the predetermined website should be unblocked, a command that modifies the predetermined list to enable the respective user device of the plurality of user devices to access the predetermined website,
wherein the machine-learning algorithm is Naive Bayes algorithm that uses the web gateway data and the threat data as inputs to a learned Naive Bayes model,
wherein the learned Naive Bayes model comprises a plurality of attributes, a plurality of class probabilities, and a plurality of conditional probabilities based on the web gateway data and the threat data, and
wherein the plurality of attributes comprise a cyberattack campaign attribute, a secure website reputation attribute, a secure website category attribute, and a malicious content presence attribute.

* * * * *